Oct. 28, 1941.  L. MULLNER  2,260,634
COMBINED SPRING AND SHOCK ABSORBER
Filed Aug. 9, 1939   3 Sheets-Sheet 1

Ludwig Mullner INVENTOR
BY
ATTORNEY

Oct. 28, 1941.    L. MULLNER    2,260,634
COMBINED SPRING AND SHOCK ABSORBER
Filed Aug. 9, 1939    3 Sheets-Sheet 2

Ludwig Mullner INVENTOR
BY
ATTORNEY

Oct. 28, 1941.                L. MULLNER                 2,260,634
                    COMBINED SPRING AND SHOCK ABSORBER
                    Filed Aug. 9, 1939         3 Sheets-Sheet 3

Ludwig Mullner  INVENTOR
BY
ATTORNEY

Patented Oct. 28, 1941

2,260,634

UNITED STATES PATENT OFFICE 2,260,634

COMBINED SPRING AND SHOCK ABSORBER

Ludwig Mullner, St. Paul, Minn.

Application August 9, 1939, Serial No. 289,167

8 Claims. (Cl. 267—34)

My invention relates to an improvement in a combined spring and shock absorber wherein it is desired to provide a device capable of preventing irregularities in a roadbed from being transmitted to the frame of a vehicle.

Many types of springs have been previously constructed and many ways have been provided for individually supporting the wheels of a motor vehicle. Furthermore, many types of shock absorbers have been previously constructed some of which employ liquid therein to help absorb the shock of a wheel moving vertically with respect to a frame supported by the wheel.

It is the purpose of the present invention to provide a means of individually supporting wheels and to provide a spring means for resiliently supporting the frame with respect to the wheel. Incorporated in this spring, I provide a shock absorber which prevents too quick expansion of the spring, and thereby acts to dampen shock in the manner of the usual shock absorber.

It is a purpose of my invention to provide a spring in the nature of a coil spring and to provide within the coils an hydraulic shock absorber which is capable of dampening the spring expansion movement. With this arrangement, a spring and shock absorber can be combined in a space usually required by one of these elements alone, and the resulting construction is more effective than any separate arrangement of the two elements because both the spring and the shock absorber may be secured in coaxial relationship.

It is a feature of my invention to provide a coil spring resisting compression and to incorporate therein a shock absorber resisting expansion. These elements are arranged in a novel combination so that as the spring is compressed, the liquid within the shock absorber may readily enter a compression chamber and so that when the spring expands the liquid may flow comparatively slowly from this compression chamber. A combined spring and shock absorber may in this way be formed.

It is a further feature of my invention to provide a combined spring and shock absorber in which an hydraulic cylinder and piston are interposed within a coil spring and the cylinder is so arranged with respect to the surrounding space that movement thereof in either direction is cushioned by auxiliary springs. Thus as the limit of movement is approached, additional spring tension is created to provide a tendency to dampen such extreme movement.

These and other objects and novel features of my invention will be clearly and fully set forth in the following specification and claims.

In the drawings forming a part of my specification:

Figure 1:
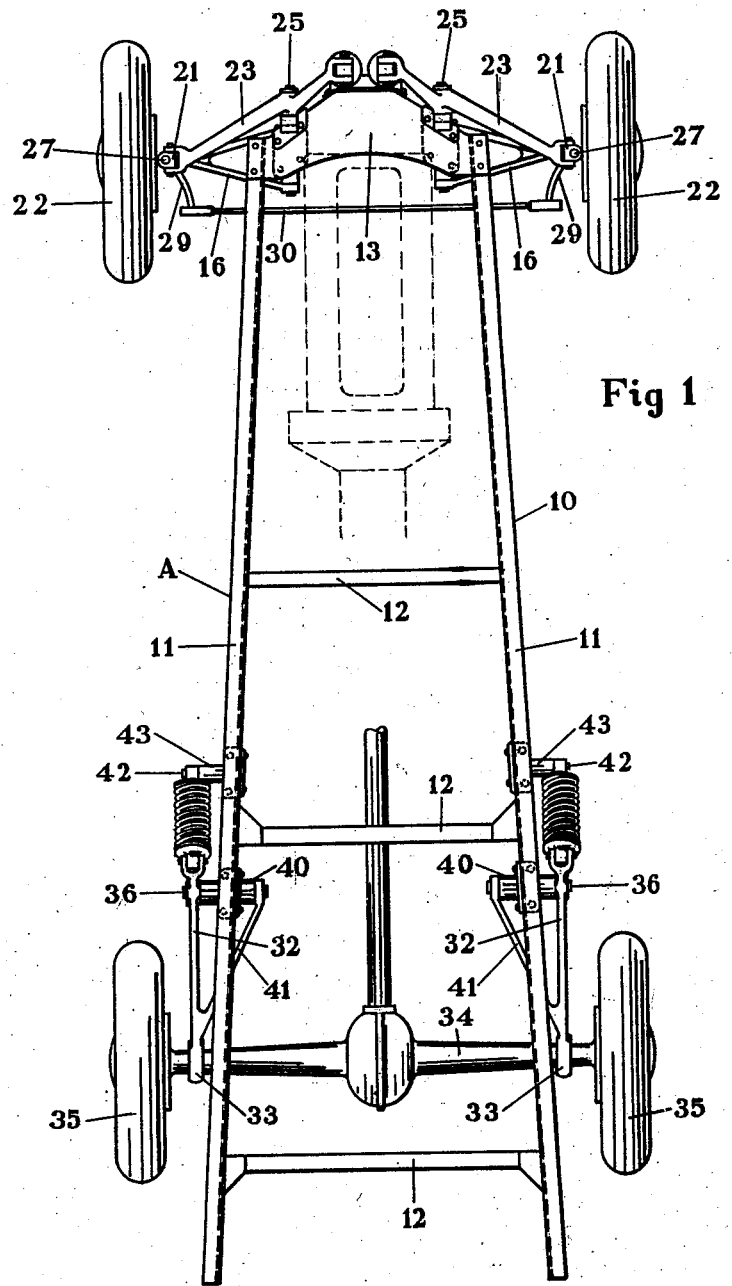
Figure 1 is a top plan view of an automobile chassis illustrating the spring arrangement and the wheel suspension used in connection therewith.

The vehicle A includes a chassis 10 of any suitable or desired construction including in the form illustrated a pair of longitudinally extending frame members 11 having a series of braces 12 therebetween. At the front of the frame a transverse brace 13 is provided to which the front elements of the spring and shock absorber may be attached. A downwardly projecting plate 14 is provided on the cross member 13 to which the lower extremities of the combined spring and shock absorber units B are pivotally attached at 15.

A pair of links 16 are pivotally secured at 17 to brackets 19 at the forward end of the chassis and secured to the cross member 13 and the downwardly extending portion 14. These links are pivoted at their outer ends at 20 to the yokes 21 supporting the front wheels 22. As illustrated in Figure 1 of the drawings, the links 16 are preferably bifurcated, having two ends which extend on opposite sides of the brackets 19 accommodating the pivot 17.

A pair of arms 23 are pivoted at their outer extremities by the pivots 24 to the yokes 21 supporting the wheels 22. These arms or levers 23 are hingedly supported by the pivots 25 to the brackets 19 secured to the frame 10. The opposite ends of the levers 23 are connected by the pivots 26 to the upper extremities of the combined spring and shock absorber units B.

The yokes 21 are pivotally connected at 27 to the wheel assembly which in turn is provided with arms 29 connected by the usual tie rod 30. The vehicle may be steered in the usual manner by pivoting the wheels in unison about the pivots 27.

Figure 2:
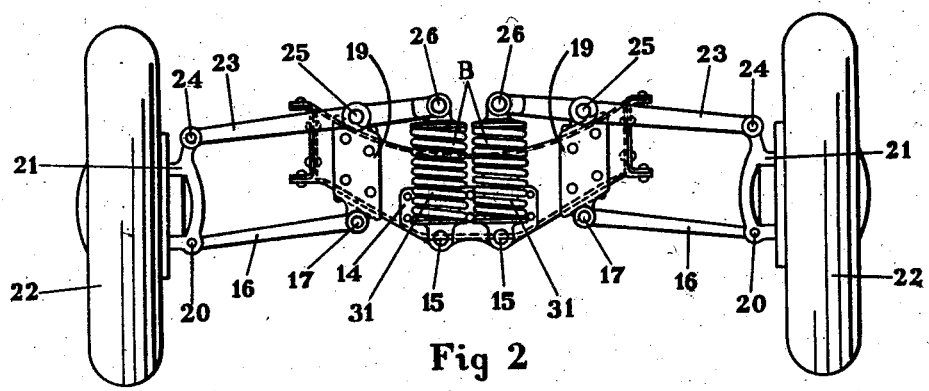
Figure 2 is a front elevational view of the front wheels of the vehicle illustrating the spring suspension used in connection with the front wheels of the vehicle.

It will be noted upon an examination of Figure 2 of the drawings that if either of the wheels 22 passes over an upstanding projection in its path, the wheel will be raised by the projection, pivoting the outer end of the lever 23 and the outer end of the connected link 16 upwardly. This causes a downward movement of the inner end of the lever 23, acting to compress the spring 31, forming a part of the shock absorber units B. When the wheel 22 drops into a hole or depression in the road, the lever 23 pivots in the opposite direction, actuating the shock absorber within the spring 31 and permits the spring 31 to expand somewhat, as this spring is of course at normal times under a considerable compressive strain. The levers 23 and links 16 maintain the proper angle between the wheels 22 and the surface of the road, regardless of the height of the wheel with respect to the frame of the vehicle.

Figure 3:
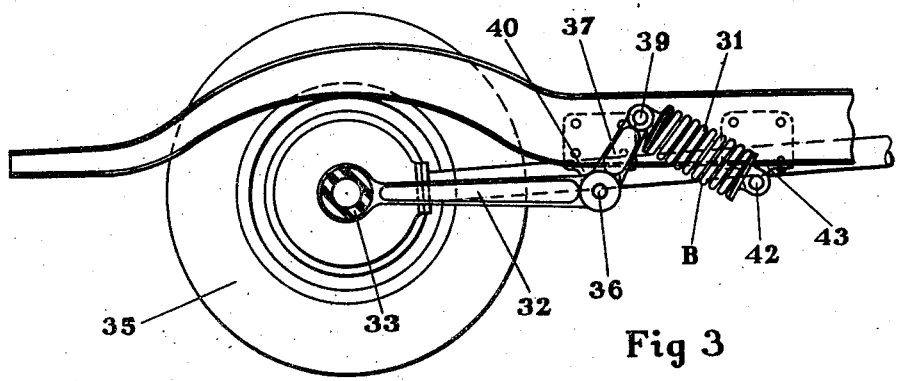
Figure 3 is a side elevational view of the rear wheel spring suspension of the vehicle, the view being taken within one of the rear wheels of the vehicle looking toward the chassis.

The rear wheels are suspended as best illustrated in Figures 1 and 3 of the drawings. Levers 32 are secured through a flexible joint 33 with the rear axle housing 34 containing an axle upon which are mounted the rear wheels 35. The levers 32 are pivoted upon a pivot 36, and an offset arm 37 on each lever is pivoted at 39 to one end of a shock absorber unit B. The levers 32 thus are in the form of bell cranks centrally pivoted to fixed brackets 40 on the frame and having one arm of the bell crank flexibly connected to the axle housing, while the other end thereof is pivoted to a shock absorber and spring unit B. The levers 32 are provided with a brace arm 41 through the end of which may extend the pivot 36. These brace arms 41 assist in holding the axle housing 34 at right angles to the longitudinal axis of the vehicle.

The spring units B secured at 39 to the levers 32 are secured at their other extremities by pivots 42 to brackets 43 secured to the frame members 11. It should be noted that as the wheels 35 pass over an upstanding projection in the path of the wheels, the wheels will be pivoted upwardly, rotating the bell cranks 32 in a clockwise direction as viewed in Figure 3 and tending to compress the springs 31 of these units B. As a wheel 35 drops into a hole or depression in the roadway, the initial compression on the springs 31 tends to rotate the bell cranks 32 in a counter-clockwise direction as viewed in Figure 3, but this action is impeded as will be later shown in detail, by the shock absorber portion of the units B enclosed within the spring 31.

Figures 4, 5:
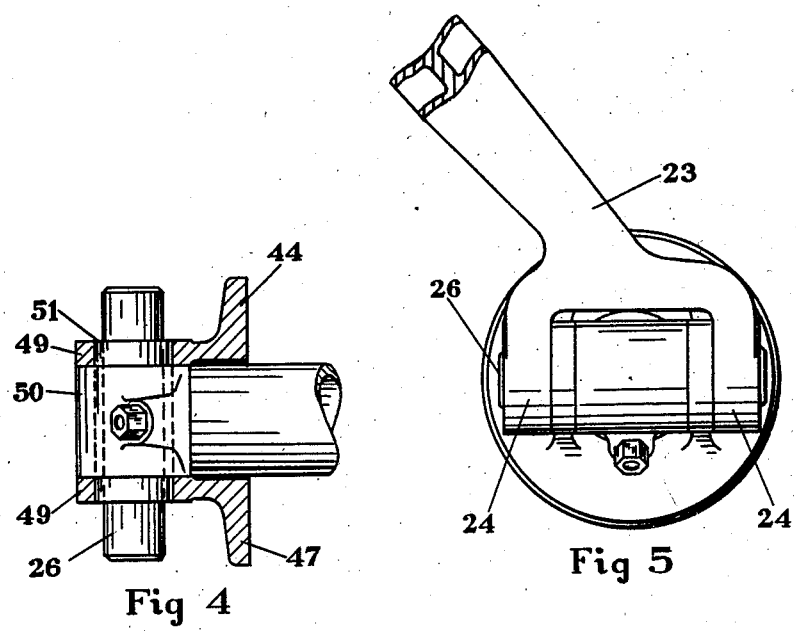
Figure 4 is a detail sectional view of one end of my shock absorber, illustrating the manner in which the same may be mounted.
Figure 5 is a top plan view of a bracket arm connected to one end of the shock absorber, illustrating the way the arm is pivotally secured to the end of the shock absorber.
Figure 6:
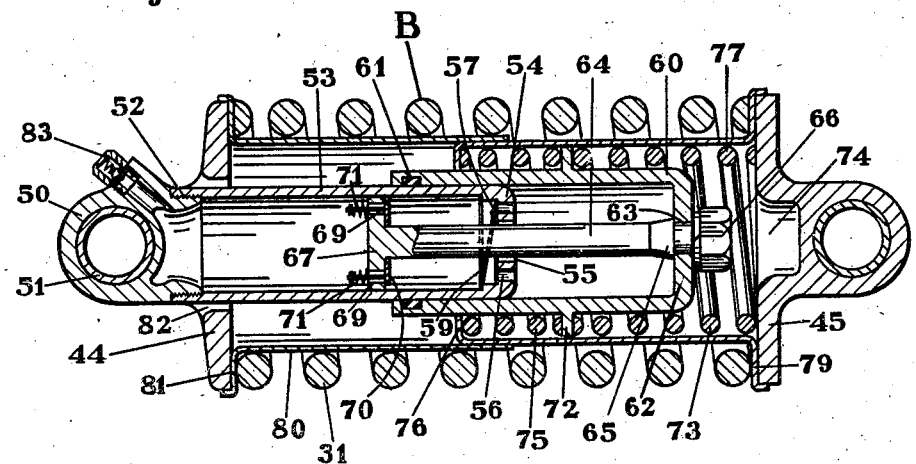
Figure 6 is a sectional view of the shock absorber, illustrating the internal structure.

The combined spring and shock absorber unit B is best illustrated in Figure 6 of the drawings. In this figure will be seen a pair of end plates 44 and 45 having interposed therebetween a compression spring 31. The end plate 44 is formed as best illustrated in Figures 4 and 5 of the drawings, and includes a disc-like flange 47 having a pair of outwardly projecting ears 49 thereupon, through which the pivot 26 may extend. An end socket 50 is transversely drilled to accommodate a bearing sleeve 51, which sleeve extends both through the end socket 50 and the ears 49. As illustrated in Figure 5, the levers 23 are provided with a bifurcated end 24 which straddles the ears 49 and end socket 50; so that when the pivot 26 is in place, the combined shock absorber and spring is properly attached to the lever 23.

The end socket 50 forms one end of an hydraulic cylinder and this socket is threaded at 52 to accommodate a sleeve 53. This sleeve is provided with a closed end 54 having a central opening 55 therethrough and having inlet openings 56 arranged in a ring concentric with the central opening 55. A valve sealing ring 57 extends over the openings 56 and is held in place by a spring 59 secured to the inner surface of the sleeve 53.

The sleeve 53 fits within a sleeve 60 and is arranged in telescopic relation thereto. A sealing ring 61 prevents oil or other hydraulic medium from flowing between these sleeves 53 and 60. A sleeve 60 is provided with a closed end 62 having an axial opening 63 therein. A piston rod 64 extends through the opening 63 and a shoulder 65 on this rod abuts the closed end 62 of the sleeve. The end of the piston rod 64 is threaded to accommodate a nut 66. When this nut 66 is tightened, the opening 63 is entirely sealed, and the piston rod 64 is securely attached to the closed end 62 of the sleeve 60.

The piston rod 64 extends through the opening 55 in the closed end 54 of the sleeve 53, and a piston 67 is provided on the end of this rod. A series of valve openings 69 are arranged in a ring concentric with the piston 67 and a ring-shaped valve seat 70 overlies the surface of the piston 67 to which the valve rod 64 is attached. Spring means 71 are provided to normally urge the seat 70 to close the opening 69.

The sleeve 60 is provided with a circumferential ring 72 surrounding the same. A spring 73 is interposed between the ring 72 and the end plate 45. A recess 74 is provided in the end plate 45 to accommodate the nut 66, in case the sleeve 60 should move to compress the spring 73 sufficiently to cause the nut 66 to come into proximity with the end plate 45. A spring 75 is interposed between the ring 72 and an inturned circular flange 76 on a hollow cylindrical housing member 77. This housing member 77 is provided with a circumferential flange 79 which is interposed between the end of the spring 31 and the end plate 45.

In operation, it will be seen that as the vehicle passes over an upstanding projection or bump in the roadway, the end plates 44 and 45 are moved toward one another. This action compresses the spring 31 and also slides the sleeve 53 into the sleeve 60, these sleeves telescoping together. As the sleeves 53 and 60 are filled with oil or other hydraulic medium, however, this action tends to open the holes 56 in the closed end 54, as the oil within the sleeve 60 must escape into the sleeve 53. As the valve seats 57 move readily away from the holes 56, the hydraulic medium flows readily into the chamber between the piston 67 and the closed end 54 of the sleeve 53. As the limit of movement of the end plates 44 and 45 toward one another is reached, however, the spring 31 tends to separate the plates 44 and 45 to their normal spacing. The valve seat 57 is then urged against the closed end 54 of the sleeve 53, and the expansion of the spring 31 must force the hydraulic medium through the opening 55 about the piston rod 64. This opening 55 is purposely made loose to permit oil to seep therethrough at a desired rate. If desired, auxiliary openings through the end 54 of the sleeve 53 may be provided to permit this leakage.

Thus it will be seen that the recoil movement of the spring 31 is necessarily checked in speed by the hydraulic medium in the compression chamber between the piston 67 and the closed end 54 of the sleeve 53. The spring 31 naturally tends to urge the plates 44 and 45 apart until the normal compression of the spring 31 to support the weight of the vehicle is reached.

A considerable compression of the spring 31 will tend to move the sleeve 60 with respect to the end plate 45, compressing the spring 73. As the spring 73 is compressed, the piston 67 slides to the left as viewed in Figure 6 of the drawings, within and with respect to the sleeve 53. This causes the valve seat 70 to admit fluid into the compression chamber, as the piston moves toward the left with respect to the sleeve 53. Thus under extreme compression of the spring 31, an additional spring 73 resists further compression of the spring 31. Thus in case of an extreme jar tending to compress the spring 31, the movement is dampened by the auxiliary spring 73. The spring 75 tends to prevent movement of the cylinder 60 in one direction with respect to the end plate 45, while the spring 73 tends to resist movement in the other direction with respect to this end plate. A balance is maintained between these springs. Hydraulic liquid may gradually seep back into the space to the left of the piston 67 within the sleeves 53 by flowing around the edges of this piston, it being understood that the piston forms a check to require some time for the reverse flow of oil out of the compression chamber.

The housing within which the springs 73 and 75 and the hydraulic cylinder and piston are concealed is formed by the hollow cylindrical sleeve 77 and the relatively telescopically arranged hollow cylindrical sleeve 80. This last mentioned sleeve 80 is provided with a peripheral flange 81 extending beneath the end of the spring 31 and the end plate 44 to hold the housing in proper position. Openings 82 are provided through the end plate 44 to permit air to enter this outer housing to provide unimpeded action of the shock absorber.

It will be noted that any movement tending to separate the end plates 44 and 45 will be checked or slowed by the oil within the compression chamber which must leak out of this chamber as the expansion of the spring 31 takes place. The shock absorber, however, has no tendency to check movement of the end plates 44 and 45 toward one another, as this movement is resisted by the spring 31. As the movement of the combined spring and shock absorber approaches either extreme position of its movement, either the spring 73 or the spring 75 comes into play to fortify the action of the spring 31 or of the shock absorber and to provide an increased resistance near the extremity of movement of the end plates in either direction.

In order that the supply of hydraulic liquid within my combined spring and shock absorber may be replenished when necessary, a filling opening 83 may be provided in any suitable place such as through the socket head 50. Additional oil inserted through the opening 83 gradually is forced through the opening 69 into the compression chamber, leaking out around the piston rod 64 into the space between the closed end 54 of the sleeve 53 and the closed end 62 of the sleeve 60. The proportions of my shock absorber may be designed to provide any desired distance of travel of any of the moving elements, and the springs and cylinders may be of the required size to do the desired task.

It will be noted from an examination of the drawings, that the bell crank levers 32 extend substantially horizontal and in line with the frame. Thus when the weight of the car is on these levers tending to compress the springs 31, the levers may pivot in either direction with the same amount of ease. In other words, the normal position of these levers or rocker arms as they might be termed, is a horizontal position, and pivoting of these arms or levers in either direction moves them out of this horizontal position. Having the levers aligned with the frame acts to transmit the weight properly along a straight horizontal line.

In accordance with the patent statutes, I have described the principles of construction of my combined spring and shock absorber; and while I have endeavored to set forth the best embodiment thereof, I desire to have it understood that this is only illustrative of a means of carrying out my invention, and that obvious changes may be made within the scope of the following claims without departing from the spirit of my invention.

I claim:

1. In a spring and shock absorber unit, a pair of spaced end plates, a coil spring interposed between said end plates, a cylinder secured at one end to one of said end plates, a sleeve in telescopic relation to said cylinder, resilient means connecting said sleeve to the other of said end plates, a closed end on said sleeve, a piston rod secured to said closed end and extending through the other end of said cylinder, a piston on said rod within said cylinder, said other end of said cylinder extending into proximity with said rod, and check valve means in said other end of said cylinder.

2. In a spring and shock absorber unit, a pair of end plates, a coil spring interposed between said plates, a cylinder secured to one end plate, a piston in said cylinder, a piston rod extending through the other end of said cylinder, a sleeve in telescopic relation to said cylinder, a closed end on said sleeve to which said piston rod is secured, and spring means resiliently connecting said sleeve to said other end plate.

3. In a spring and shock absorber unit, a pair of end plates, a coil spring between said end plates, a cylinder secured to one end plate, a piston in said cylinder, a rod on said piston extending through said other end of said cylinder, a second cylinder having an open end in telescopic relation with said first cylinder and a closed end to which said piston rod is attached; and spring means resisting movement in either direction with respect to said other end plate.

4. In a spring and shock absorber unit, a pair of end plates, a coil spring between said end plates, a cylinder secured for movement with one of said end plates, a piston in said cylinder, a piston rod extending through the other end of said cylinder, a sleeve secured in telescopic relation to said cylinder, a closed end on said sleeve, means securing said piston rod to said sleeve for movement therewith, and spring means resisting movement of said sleeve in either direction with respect to the other of said end plates.

5. In a spring and shock absorber, a pair of spaced end plates, a coil spring mounted between said end plates, a cylinder secured from movement with one of said end plates, a piston in said cylinder, a rod on said piston extending through the other end of said cylinder, a sleeve having an open end in telescopic relation with said cylinder, a closed end on said sleeve, means securing said piston rod to said sleeve for movement therewith, a flange encircling said sleeve, spring means interposed between said flange and the other of said end plates, spring means positioned upon the other side of said flange, means for anchoring the extremity of said last named spring means to said other end plate, and check valve means in said other end of said cylinder.

6. In a spring and shock absorber unit, a pair of spaced end plates, a coil spring interposed between said end plates, a cylinder secured from movement with one of said end plates, a piston within said cylinder, a piston rod on said piston extending through the other end of said cylinder, a sleeve having an open end in telescoping relation with said cylinder, means securing said piston rod to said sleeve for movement therewith, a closed other end on said sleeve, a flange encircling said sleeve, a housing encircling said sleeve and flange, means securing said housing to the other of said end plates, an inturned flange on the extremity of said housing, a spring interposed between said flange on said sleeve and said other end plate, and a spring interposed between said flange on said sleeve and said inturned flange on said housing.

7. In a spring and shock absorber unit, a coil spring, an end plate at each end of said spring, a sleeve secured to one of said end plates, a closed end on said sleeve, a second sleeve in telescopic relation to said first sleeve, means resiliently connecting said second sleeve to the other of said end plates, a closed end on said second sleeve, a piston rod secured to closed end on said second sleeve extending through said closed end on said first sleeve, a piston within said first named sleeve on said rod forming a chamber within said first named sleeve between the closed end thereof and said piston, said first named closed sleeve end having passage means therethrough and a piston rod opening therethrough forming the sole means of communication with the space within said second sleeve between said closed ends, said piston having passage means therethrough forming the sole means of communication between opposite ends of said piston, and check valve means through said passage means in said piston and in said passage means in said first named closed sleeve end, to permit liquid to flow into said chamber, and to restrict the flow of liquid from said chamber.

8. In a spring and shock absorber unit, a coil spring, an end plate at each end thereof, a cylinder secured to one of said end plates and enclosed within said spring, a sleeve in telescoping relation with said cylinder, means resiliently connecting said sleeve to the other of said end plates, a closed end on said sleeve, a piston rod secured to said closed end extending into said cylinder, a piston in said cylinder on said rod, forming a compression chamber between said piston and the end of said cylinder through which said rod extends; said cylinder end having passage means therethrough and a piston rod opening therethrough forming the sole means of communication with the space between the closed end of said sleeve and said cylinder end, said piston having passage means therethrough forming the sole means of communication between opposite ends thereof, and check valve means in said piston passage means and in said passage means, in said cylinder end to admit fluid into said compression chamber but to restrict the flow out of said chamber.

LUDWIG MULLNER.